United States Patent [19]
Evens

[11] Patent Number: 5,236,475
[45] Date of Patent: Aug. 17, 1993

[54] PAPERMAKING APPARATUS INCLUDING BAFFLES

[75] Inventor: David A. Evens, Duluth, Minn.

[73] Assignee: Lake Superior Paper Industries, Duluth, Minn.

[21] Appl. No.: 978,620

[22] Filed: Nov. 19, 1992

[51] Int. Cl.$^5$ .............................................. B01D 19/00
[52] U.S. Cl. ....................................... 96/197; 55/462; 162/337
[58] Field of Search ..................... 55/41, 55, 189–193, 55/462–465; 162/336–339

[56] References Cited

U.S. PATENT DOCUMENTS

| | | | |
|---|---|---|---|
| 1,550,156 | 8/1925 | Fogler | 55/88 |
| 2,015,680 | 10/1935 | Kermer | 55/463 |
| 2,088,089 | 7/1937 | McDonald | 225/17 |
| 2,788,080 | 4/1957 | Guarin | 183/2.7 |
| 3,025,928 | 3/1962 | Heath | 55/200 |
| 3,101,659 | 8/1963 | Hollands | 95/97 |
| 3,206,917 | 9/1965 | Kaiser et al. | 55/41 |
| 3,275,249 | 9/1966 | Karoly et al. | 239/523 |
| 3,538,680 | 11/1970 | Kaiser | 55/41 |
| 3,626,673 | 12/1971 | Stockton et al. | 55/199 |
| 4,071,193 | 1/1978 | Sternby et al. | 239/11 |
| 4,555,253 | 11/1985 | Hull et al. | 55/170 |
| 4,906,264 | 3/1990 | Szymaszek et al. | 55/324 |
| 4,912,782 | 4/1990 | Robbins | 4/192 |

FOREIGN PATENT DOCUMENTS 461194  4/1975  U.S.S.R. ................................ 55/55

Primary Examiner—Tim Miles
Attorney, Agent, or Firm—Haugen and Nikolai

[57] ABSTRACT

A papermaking deaeration apparatus including a receiving chamber, and a plurality of cleaning and deaeration wings extending therefrom. A baffle is provided in the chamber of the receiver proximate the opening of each wing which communicates deaerated paper stock into the receiver chamber. The baffles redirect downrushing deaerated paper stock such that it is dispensed in a "knifing shape" into the pool of paper stock contained in the chamber of the receiver. Hence, standing waves and splashing in the pool of paper stock in the receiver is reduced. The static pressure head created by the pool of paper stock is more uniform such that fluctuations in the static head are reduced. Mechanical vibrations which can reach the paper machine headbox and the primary cleaner supply pump are reduced such as the quality, consistency and caliper of the paper manufactured by the headbox is improved. Each baffle has a concave surface facing inward towards the wing chamber to cause conversion of the downrushing deaerated paper stock into a wide thin knife shape before entering the receiver chamber. The deaerated paper stock is deflected by the baffle downward into the receiver chamber below the surface of the pool.

13 Claims, 4 Drawing Sheets

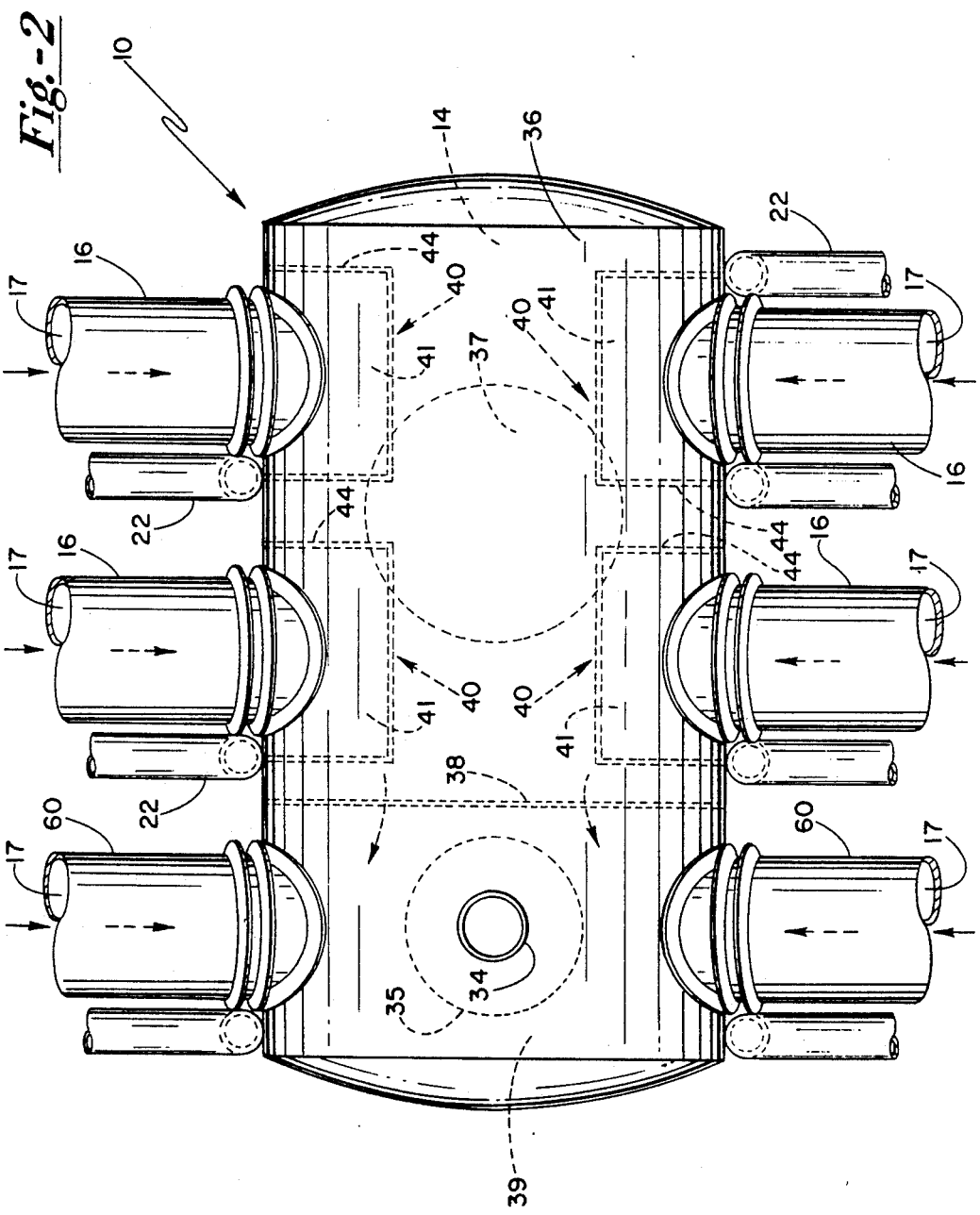

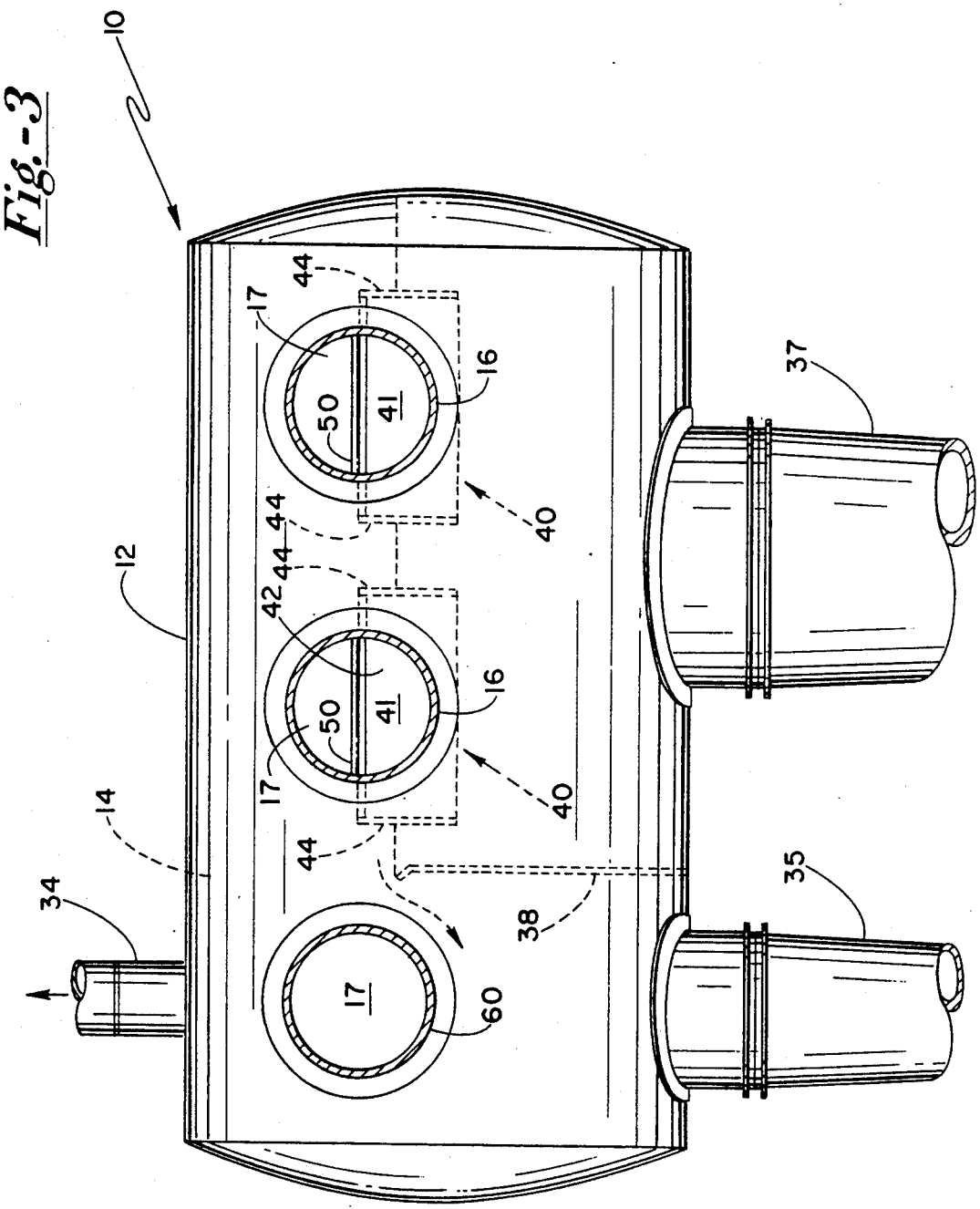

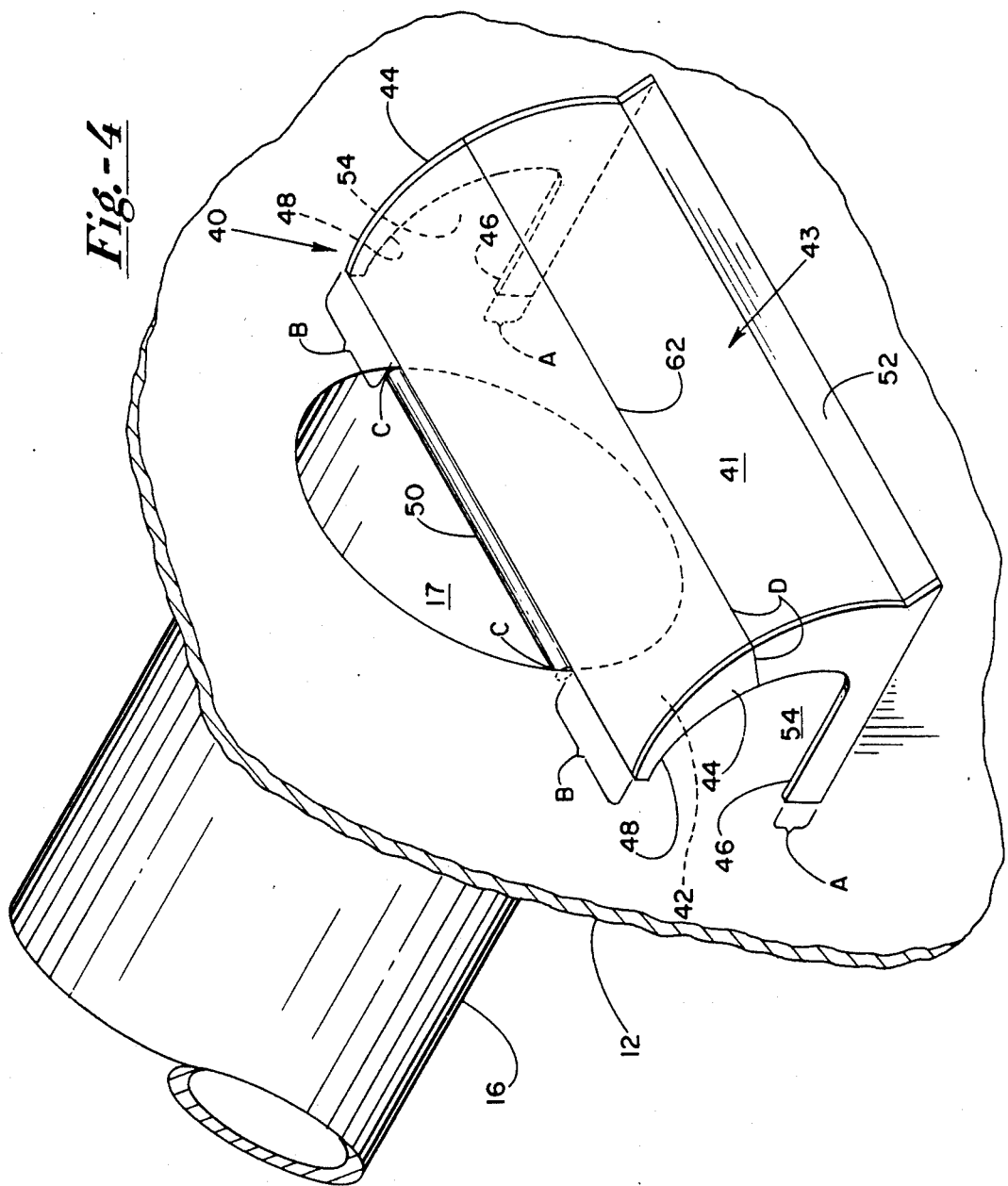

PAPERMAKING APPARATUS INCLUDING BAFFLES

BACKGROUND OF THE INVENTION

I. Field of the Invention

This invention relates generally to papermaking, and includes an apparatus for deaerating an air-containing aqueous suspension of papermaking stock which is introduced into deaeration chambers or wings extending from a stock receiver. More specifically, the present invention is directed to a papermaking apparatus capable of providing a more constant hydrostatic head pressure to a papermaking headbox to improve the quality and consistency of the manufactured paper.

II. Background of the Invention

In the papermaking industry, an aqueous cellulosic paper stock is processed in preparation of ultimately being formed into paper by a device known as a headbox. The aqueous suspension of cellulosic papermaking stock is first cleansed of dirt and impurities, typically by hydrocyclones as a whirling annulus, and injected into elongated enclosures or wings. The hydrocyclones also facilitate deaeration by deatomizing the air molecules from the suspension by thrusting the suspension, which is formed into an annulus, against the inner wall of the deaeration wing chamber. Each of the deaeration wing chambers extend outwardly and upwardly from a large stock receiver. The chamber defined in each wing is in communication with the receiver interior such that the deaerated stock flows into the receiver to form a pool. Both the receiver and the wing chambers are maintained under a vacuum sufficient to effect deaeration of stock suspension sprayed into the wings, where the vacuum in the receiver chamber and wing chambers is substantially equal.

The pool of deaerated stock in the receiver creates a hydrostatic head. The deaerated paper stock is withdrawn from the pool through a lower port and is communicated to the papermaking headbox. The headbox subsequently manufactures paper from the deaerated and cleansed paper stock. The quality and caliper of the manufactured paper is dependent upon many factors including the quality of the papermaking stock, as well as how constant the hydrostatic head created by the pool of paper stock suspension is maintained. It is crucial that the hydrostatic head be maintained as constant as possible to reduce headbox vibration, and pressure fluctuations, both of which can degrade the quality of paper manufactured by the headbox. The more constant the pool level of deaerated stock is maintained in the receiver chamber, the more constant the resulting hydrostatic head, and hence, the higher the quality and consistency the resulting paper product.

U.S. Pat. No. 3,206,917 to Kaiser which is assigned to Clark & Vicario Corporation addresses the problem of maintaining a substantially uniform hydrostatic head of deaerated paper stock. This invention teaches a weir which is positioned in the receiver chamber to define both a pool of deaerated paper stock, and an overflow chamber. Deaerated paper stock in excess of the amount needed to provide a predetermined hydrostatic head overflows from the pool into the overflow chamber, and is recycled and further cleansed of dirt and other impurities. A generally uniform hydrostatic head results from the pool in the receiver when the level of deaerated stock matches the height of the weir. However, the pool level in the receiver is still subject to variations due to both a standing wave and splashing generated by the deaerated stock rushing from each of the inclined wings into the receiver. Deaerated stock comes rushing down each of the wings into the receiver agitates the surface of the pool such that resulting fluctuations in the hydrostatic head are generated. These variations in the hydrostatic head are sensed by the papermaking headbox. Hence, even when employing a weir, the consistency and quality of the paper manufactured by the headbox is subject to degradation.

A papermaking apparatus with reduced fluctuations of the hydrostatic head created by the deaerated paper stock, including apparatuses which have weirs, is desirable to improve the quality and consistency of the manufactured paper. Further, reducing the variations of the pool level, including standing waves and splashing, will reduce the amount of deaerated paper stock which overflows into the overflow chamber, thus reducing the amount of paper stock which needs to be subsequently recleansed and further deaerated. The reduction of further processing the overflow paper stock reduces the amount of expensive deaerating chemicals required as well.

OBJECTS OF THE INVENTION

It is accordingly a principle object of the present invention to provide a papermaking apparatus capable of manufacturing paper of superior quality, having a receiver and a plurality of extending deaeration wings which is capable of maintaining a constant pool level of deaerated paper stock, and hence, a substantially uniform hydrostatic head.

It is a further object of the present invention to provide a papermaking apparatus which reduces the amount of deaerated paper stock which overflows a weir into an overflow chamber to reduce the amount of reprocessing of the overflowed paper stock.

It is still yet a further object of the present invention to provide a device which is adaptable to both new and preexisting receivers.

It is still yet a further object of the present invention to provide a papermaking apparatus capable of reducing standing waves and splashing in the receiver pool which is efficient, inexpensive and easy to manufacture.

SUMMARY OF THE INVENTION

The foregoing features and objects are achieved by providing a papermaking apparatus having a paper stock receiver including a baffle disposed proximate the outlet from each deaeration wing to reduce standing waves and splashing. The invention comprises an apparatus having a receiver housing defining a chamber therewithin for holding a suspension of paper stock as a pool. At least one wing is connected to the receiver housing and is comprised of a conduit forming a passageway which is in communication with the chamber. Each wing extends upwardly from the housing and is inclined. A suspension injecting mechanism, such as one or more hydrocyclones, is provided for each wing for injecting the suspension into the wing to facilitate deaeration. A vacuum is provided for removing air from the receiver chamber and each of the wings passageways. A baffle is disposed in the chamber proximate the outlet from each wing passageway into the receiver chamber. Each baffle reduces turbulence of the pool surface held in the receiver due to a standing wave or splashing, which would otherwise be generated absent the baffle due to the deaerated suspension rushing from the wing into the receiver. Hence, a substantially constant hydrostatic head is created by the suspension pool and presented to a papermaking headbox. The quality, caliper and consistency of the paper made by the headbox is thus greatly improved.

Each baffle preferably has a concave surface which is positioned facing toward the respective deaeration wing passageways. Thus, suspension which is injected into the respective wing passageway flows downward toward the receiver at a high flow rate and impinges upon the concave surface of the respective baffle. The concave surface redirects the suspension downwardly into the pool surface, and converts the flow into a wide knife shape. This design inhibits the downrushing deaerated paper stock from disturbing the pool surface of paper stock residing in the chamber of the receiver housing. The baffle preferably comprises an arcuate shaped sheet of stainless steel forming a concave surface. A pair of L-shaped side plates with curved upper legs are affixed to each end of the arcuate sheet, with the lower legs extending away from the concave surface. The legs of each side plate are subsequently attached to the inner wall of the receiver at each side of the opening defined by the respective wing. An opening is defined by each side plate between the respective upper and lower legs, and the receiver sidewall. Each opening allows escape of air or other non-condensible gasses which might otherwise become entrained below the surface of the pool by the downrushing paper stock. The lower end of the arcuate plate, and the lower leg of each side plate, are positioned below the surface of the suspension pool surface in the receiver such that the deaerated suspension from each wing is dispensed in a knife and planar shape beneath the surface of the suspension pool. Further, each baffle preferably comprises a cylindrical rigid bar affixed upon the top of the baffle with a length equal to the inner diameter of the respective wing. The bar prevents the stapling of the pulp fibers of the paper stock suspension, wherein stapling is defined as the "hanging over" of fibers on what would otherwise be a thin edge presented to the incoming flow.

BRIEF DESCRIPTION THE DRAWINGS

FIG. 2 illustrates a top view of the papermaking apparatus illustrating the plurality of wings extending from the receiver, wherein the baffles are represented by hidden lines proximate the primary wings;

FIG. 3 illustrates a side view of the papermaking apparatus with the wings removed illustrating the baffle openings and bar; and FIG. 4 illustrates a perspective view of one baffle showing the concave surface, the L-shaped side plates which are affixed to the inner wall of the receiver each side of the wing opening, and a round bar extending laterally across and above the baffle.

DESCRIPTION OF THE PREFERRED EMBODIMENT

Figure 1:
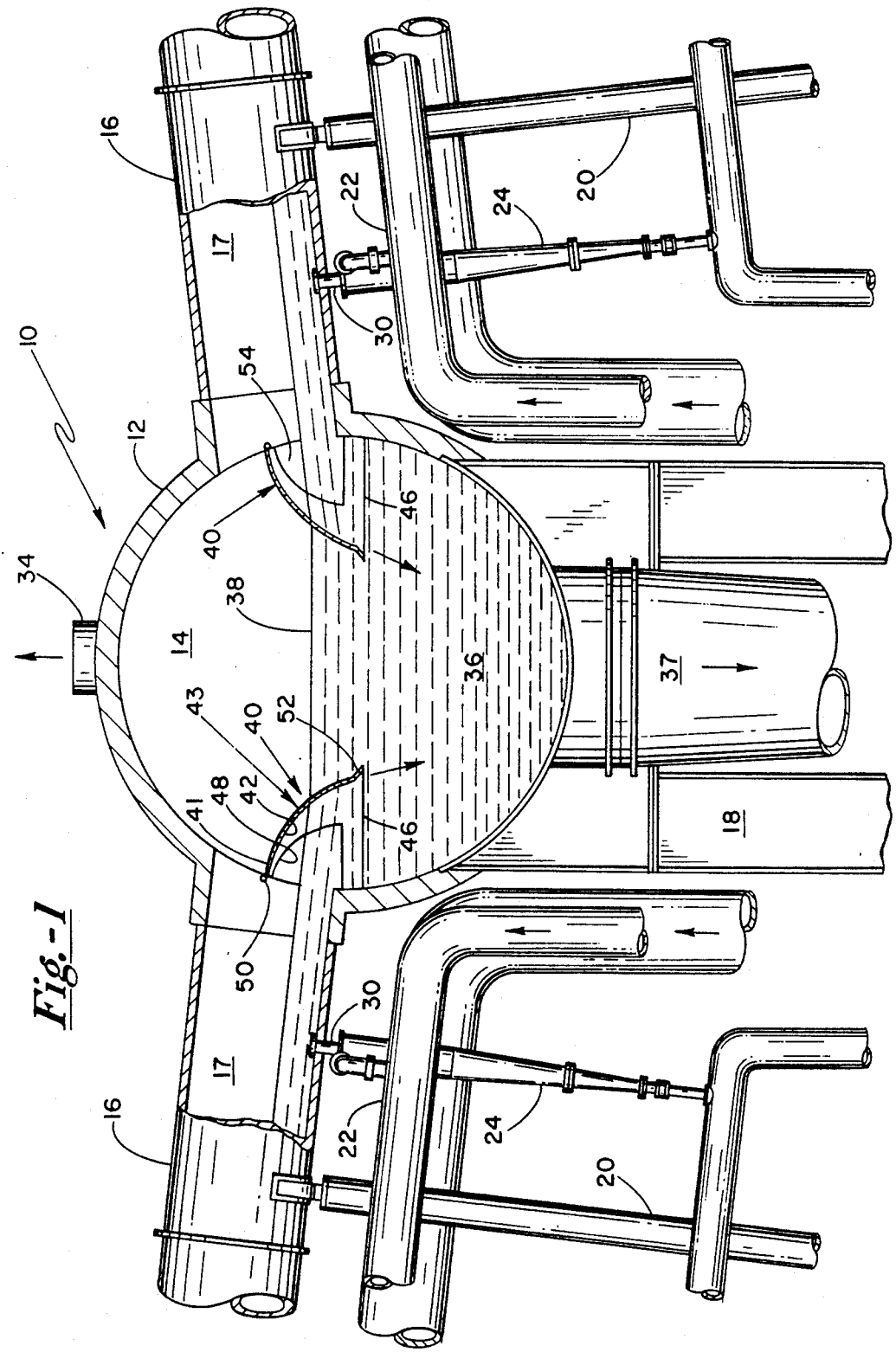
FIG. 1 illustrates a side sectional view of a papermaking deaeration apparatus including a stock receiver, and a plurality of inclined wings having a passageway communicating with the receiver chamber and extending outward therefrom. A baffle is provided adjacent the opening of each wing into the receiver chamber.

Referring to FIG. 1, a side sectional view of a paper stock deaeration apparatus is generally shown at 10. Apparatus 10 comprises a large cylindrical receiver tank 12 manufactured from stainless steel, and which defines a receiver chamber 14 therein. A plurality of tubular deaeration wings 16 securely connected to tank 12 and define a respective passageway 17. Each passageway 17 extends from receiver 12 and is in communication with chamber 14. Each wing 16 extends slightly upwardly and is inclined with respect to receiver 12. Receiver 12 is structurally supported by a support structure 18, and each wing 16 is supported by a plurality of respective supporting structures 20.

A suspension of papermaking stock which is to be deaerated by apparatus 10 is typically diluted with water, which is suitably white water. The suspension is pumped through conduits to a primary cleaning stage header (not shown) which is provided with a number of laterally extending branches 22 through which the stock suspension is delivered to a plurality of cleaners 24 making up the primary cleaning stage. Each primary cleaner 24 is comprised of a centrifugal solids separating means, such as a hydrocyclone. A plurality of hydrocyclones 24 are arranged in pairs at laterally spaced locations along the length of the wings 16 The accepts outlets of the hydrocyclones 24 are connected to individual inlet pipes 30 having termini which extend into and terminate within the respective wings. A whirling annulus comprising the accepts fraction travels upwardly through the inlet pipes 30, and is explosively discharged from the termini of the inlet pipes 30 as a forceful spray against the upper inner surface of the respective wings 16.

Additional advantages are obtained by positioning the inlet pipes 30 so that the spray impinges on the interior upper surfaces of the wings 16 in order to promote the breaking up of the droplets, known as deatomizing, and consequently improve deaeration of the suspension. The chamber 17 defined by each wing 16, which is in communication with chamber 14 of receiver 12, is maintained under a vacuum sufficient to effect deaeration of the paper stock suspension sprayed thereinto. The vacuum is applied at an upper port 34 of receiver 12, and is sufficient to effect deaeration of stock suspension sprayed thereinto, the vacuum in the chamber 14 and passageways 17 being of substantially equal value. The vacuum is maintained by a booster ejector, a condenser, and a vacuum pump (not shown) which is connected to chamber 14 of receiver 12 at port 34. The degree of vacuum within the system 10 is prescribed in U.S. Pat. No. 2,614,656, which is hereby incorporated by reference.

The deaerated paper stock suspension which is injected into each wing 16 subsequently flows downward from respective passageway 17 into chamber 14 of receiver 12, and forms a pool of deaerated paper stock suspension illustrated at 36. The level of pool 36 is defined and maintained by a weir 38. Excess deaerated paper stock suspension overflows weir 38 into an overflow chamber 39 (see FIG. 2), and is recycled and recleaned in secondary cleaning stages, similar to the primary cleaning stages previously described. Deaerated paper stock suspension 36 is dispensed from receiver 12 through a lower outlet 37 into a conduit and is communicated to a papermaking headbox (not shown). Paper is subsequently manufactured by the headbox from the deaerated and cleansed paper stock suspension in a well known manner. The papermaking apparatus described thus far is well known in the art, and is also described in U.S. Pat. No. 3,538,680 and is hereby incorporated by reference.

According to the preferred embodiment of the present invention, an improved papermaking deaeration apparatus will now be described in considerable detail. Still referring to FIG. 1, a stainless steel baffle member 40 is fixedly attached to the inner wall of receiver 12 in a four-point arrangement. Each baffle 40 is located proximate the opening of the respective passageway 17 communicating with chamber 14. Baffle 40 is preferably secured via welding techniques which are well known in the art. One primary purpose of each baffle 40 is to reduce surface turbulence of suspension 36 caused by the incoming rushing deaerated paper stock which empties from the respective wing 16 into receiver 12. Large flow rates in the order of 8500 gallons per minute from each wing 16 are common in the industry. The downrushing deaerated paper stock impinges upon a concave surface 42 of baffle 40 and is redirected downwardly into pool 36 of receiver 12 below the pool surface. Hence, the downrushing deaerated paper stock does not rush directly into pool 36, and baffle 40 prevents the generation of splashing, as well as a standing wave, from forming. Hence, a calm surface of deaerated paper stock forming pool 36 in chamber 14 is facilitated. Passageway 37 subsequently communicates the deaerated paper stock to the headbox (not shown), and a constant pressure head is facilitated.

Referring to FIGS. 1 and 4, baffle 40 is comprised of an arcuate sheet of stainless steel extending between and securely attached to a pair of L-shaped side plates 44. Sheet 41 defines a concave front surface 42 and a rear convex surface 43, wherein concave surface 42 faces towards the wing chamber 17. It is recognized, however, that any shaped member having a concave surface is suitable. All structures of baffle 40 are highly polished after fabrication and installation, including all welds, to prevent any tendency of an otherwise rough surface to promote agglomeration of fibers. Each side plate 44 has a straight first leg 46 terminating at a distal end. The distal end of each leg 46 has an arcuate surface of a radius equal to the radius of the large receiving tank 12. Thus, the distal end of each leg 46 mates in a flush manner with the inner wall of receiver 12. The surfaces are subsequently welded together to secure the baffle 40 to the inner wall of receiver 12 at a pair of first points, identified at "A", located below the outlet from passageway 17. Preferably, legs 46 are attached at a point 10 inches below the top level of pond 36, however, limitation to this dimension is not to be inferred. Each plate 44 also has an upper arcuate shaped second leg 48. Each leg 48 also has a distal end having arcuate surface of radius equal to the radius of the large receiving tank 12. Each distal end of leg 48 is also welded to the inner surface of tank 12, identified at "B", at each side of the opening to passageway 17, about the diameter, to provide a pair of second fastening points. Thus, a four-point arrangement is provided such that baffle 40 remains secured to the inner wall of receiver 12 while the downrushing stock impinges concave surface 42. Each baffle 40 further comprises a elongated rigid bar 50 extending across the top surface of baffle 40 to prevent a stapling effect of the paper stock suspension. Bar 50 has a length equal to the inside diameter of passageway 17, and extends outwardly from baffle 40 into passageway 17 across the opening. Stapling is defined as the "hanging over" of fibers on what would otherwise be a thin edge presented to the incoming flow.

A baffle 40 is provided for each primary wing comprising apparatus 10. Each baffle 40 deflects the downrushing deaerated paper stock discharging from each wing 16 at a high velocity and high volume flow such that the deaerated paper stock is converted from a stream with a sectional circular cross-section, to a flat fan shape and "knifed" into pool 36 at a high angle. Turbulence of pool 36 is greatly reduced, and a large standing wave normally generated by the symmetrically arranged opposing primary wings on the surface of pool 36 is eliminated. As a result, less paper stock will overflow from pool 36 into overflow chamber 40. Consequently, the primary cleaner supply pump (not shown) is operated at a considerably lower flow, away from cavitation, and consumption of deaeration chemicals is also reduced.

Further, since static head pressure in a liquid is directly proportional to its depth, pressure pulsations generated in receiver 12 by a varying level of pool 36 is reduced. Consequently, no pressure pulsations will be sensed at the paper machine headbox due to the liquid-full connection which exists between pool 36 and the headbox, which may or may not include a headbox supply pump. The reduced hydraulic pulsations and mechanical vibrations at the machine headbox are reduced such that the quality, consistency and caliper of the produced paper is improved. Since the overflow of stock 36 is reduced, the primary cleaner supply pump (not shown) is no longer operated at an excessively high flow. Hence, the liquid traffic through the deaeration system can more accurately be maintained around predetermined designed values. The deaeration efficiency of the overall apparatus 10 is improved, and the consumption of expensive deaeration chemicals which promote air removal is reduced as well.

Referring to FIG. 2, a top view of deaeration apparatus 10 is illustrated. As shown, four primary wings 16 are provided with a respective baffle 40 positioned proximate the outlet of each passageway 17 into chamber 14. Also shown is a pair of secondary wings 60, which are well known in the art. Pool 36 extends to proximate the openings into passageways 17 of each of the four primary wings 16 wherein weir 38 establishes the level of pool 36. The deaerated paper stock suspension which overflows weir 38 is collected into overflow chamber 39. The overflowed deaerated paper stock is subsequently routed via passageway 35 for subsequent cleaning to secondary cleaners, which are also comprised of hydrocyclones, such as hydrocyclone 24. Again, the present invention reduces the amount of deaerated paper stock which overflows weir 38 and which needs to be subsequently reprocessed. As shown in FIG. 2, each baffle 40 extends about a quarter of the way into chamber 14.

Referring to FIG. 3, a side view of apparatus 10 is shown illustrating air being removed via port 34 by a vacuum pump (not shown). Referring back to FIG. 1, the upper level of the deaerated paper stock entering baffle 40 remains below the upper surface of passageway 17 proximate chamber 14 such that air can communicate from within passageway 17 to chamber 14, and the vacuum pump can remove air from both chamber 14 and passageway 17. Hence, pressure is substantially equal in both chambers 17 and 14. As shown in FIG. 3, baffle 40 extends upwardly to about a mid-line well above the level of the entering paper stock, and extends across the diameter of the opening formed by passageway 17 of wing 16 emptying into and communicating with chamber receiver 12. Bar 50 has a length equal to the inside diameter of the passageway opening.

Referring to FIG. 4, a more detailed perspective view of baffle 40 adapted to the inner wall of receiver 12 proximate the respective wing opening from wing 17 is shown. FIG. 4 illustrates baffle 40, comprising plate 41 having the concave shaped inner surface 42 which is impinged by the downrushing deaerated paper stock from respective wing 16, and side plates 44. Side plates 44 are comprised of stainless steel plate serving as braces to provide structural integrity of baffle 40, and to guide the flow of paper stock toward surface 42. Baffle plate 41 has a beveled rim surface 52 which tapers outwardly to stiffen the outlet end of curved plate 41. As shown, rod 50, which is preferably comprised of stainless steel, extends along a mid-section of baffle 40 across the diameter of the wing opening, and is welded at each end to the top of baffle plate 41 at "C". Again, rod 50 prevents a stapling effect of deaerated paper stock over the top of baffle 40. Also shown in FIG. 4, is the wide open area provided between the wing passageway 17 opening, the side of receiver 12, and the concave surface 42 of baffle 40 directly below bar 50. Also shown is a pair of openings 54 formed by the respective L-shaped side plates 44 on each side of the passageway 17 opening. Openings 54 allow the escape of air or other noncondensible gasses which might otherwise become entrained below the surface of the pool 36 by the downrushing paper stock. This design thus enhances the deaeration process. Again, each leg 46 is welded to the sidewall of receiver 12 at "A" slightly below the opening of passageway 17, communicating with chamber 14, and each of the distal ends of the arcuate shaped legs 48 is welded at "B" at opposite sides of the opening into passageway 17.

A cut 62 is provided in both plate 41 and each side plate 42 to render each baffle 40 into small enough pieces (2) to pass through the manway (not shown) that typically comprises the only convenient access into chamber 36 for their installation in existing apparatus 10. The cut is welded along the edges at "D" after baffle installation. This cut 62 would not be required in new factory fabrications.

This invention has been described herein in considerable detail in order to comply with the Patent Statutes and to provide those skilled in the art with the information needed to apply the novel principles and to construct and use such specialized components as are required. However, it is to be understood that the invention ca be carried out by specifically different equipment and devices, and that various modifications, both as to the equipment details and operating procedures, can be accomplished without departing from the scope of the invention itself.

In the claims:

I claim:

1. An apparatus for deaerating a suspension comprised of paper stock, comprising:
   (a) a receiver having a housing defining a chamber therewithin for holding the suspension;
   (b) at least one wing connected to said housing and comprised of a conduit defining a passageway in communication with said chamber, each said wing extending upwardly from said housing;
   (c) means for injecting the suspension into each said wing;
   (d) vacuum means for removing air from said receiver chamber and each said wing passageway; and
   (e) a baffle disposed in said receiver chamber proximate each said wing passageway for redirecting the flow of the suspension emptying from the wing into the receiver to reduce surface turbulence of the suspension held in said receiver, said baffle comprising a baffle member defining a concave surface facing toward said wing passageway such that the suspension injected into said wing passageway flows toward and impinges upon said concave surface, wherein said baffle further comprises a pair of side plates, one affixed to each end of said baffle member.

2. The apparatus as specified in claim 1 wherein said pair of side plates have an L-shape to define an opening between the receiver housing and the respective side plate.

3. The apparatus as specified in claim 1 wherein said baffle further comprises a bar disposed upon the baffle extending laterally above said concave surface.

4. A baffle for use in a papermaking apparatus, comprising:
   a rigid member having a first and second end and an arcuate front surface defined therebetween, said front surface defining an upper and lower edge extending between said first and second ends; and
   a pair of rigid side braces, one affixed to each said first and second ends of said rigid member.

5. The baffle as specified in claim 4 wherein said lower edge of said rigid member is tapered outwardly.

6. The baffle as specified in claim 4 wherein said side braces are comprised of rigid plates.

7. The baffle as specified in claim 6 wherein each said rigid plates have an L-shape.

8. The baffle as specified in claim 7 wherein said baffle further comprises a rigid bar disposed along said upper edge of said rigid member.

9. An apparatus for deaerating a suspension comprised of paper stock, comprising:
   (a) a receiver having a housing defining a chamber therewithin for holding the suspension;
   (b) level means for establishing the suspension in the chamber at a first level;
   (c) at least one wing connected to said housing and comprised of a conduit defining a passageway in communication with said chamber, each said wing extending upwardly from said housing;
   (d) means for injecting the suspension into each said wing;
   (e) vacuum means for removing air from said receiver chamber and each said wing passageway; and
   (f) a baffle disposed in said receiver chamber proximate each said wing passageway for redirecting the flow of the suspension emptying from the wing into the receiver to reduce surface turbulence of the suspension held in said receiver, said baffle having a top and bottom edge, said bottom edge disposed below said first level established by said level means.

10. The apparatus as specified in claim 9 wherein said level means comprises a weir.

11. The apparatus as specified in claim 9 wherein said housing has an opening communicating the wing passageway to the housing chamber, and said baffle top edge is disposed across a midsection of said opening.

12. The apparatus as specified in claim 9 wherein said baffle has an concave surface facing toward said wing passageway such that the suspension injected into said wing passageway flows toward and impinges upon said concave surface.

13. The apparatus at specified in claim 12 wherein said wing conduit has a central axis, and said baffle concave surface proximate said top edge is substantially parallel to said axis such that suspension impinges upon said concave surface in a tangential manner.

* * * * *